(12) United States Patent
Lee et al.

(10) Patent No.: US 10,476,857 B2
(45) Date of Patent: Nov. 12, 2019

(54) METHOD AND APPARATUS FOR COMMUNICATION BETWEEN HETEROGENEOUS PLATFORMS

(71) Applicant: ELECTRONICS AND TELECOMMUNICATIONS RESEARCH INSTITUTE, Daejeon (KR)

(72) Inventors: Eun Seo Lee, Daejeon (KR); Hark Jin Lee, Daejeon (KR); Jun Hee Park, Daejeon (KR); Ho Jin Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 230 days.

(21) Appl. No.: 15/353,953

(22) Filed: Nov. 17, 2016

(65) Prior Publication Data

US 2017/0149867 A1    May 25, 2017

(30) Foreign Application Priority Data

Nov. 19, 2015 (KR) .................. 10-2015-0162859
Oct. 12, 2016 (KR) .................. 10-2016-0131915

(51) Int. Cl.
*H04L 29/08* (2006.01)
*H04L 29/06* (2006.01)
(Continued)

(52) U.S. Cl.
CPC .......... *H04L 63/08* (2013.01); *H04L 63/0815* (2013.01); *H04L 67/2809* (2013.01);
(Continued)

(58) Field of Classification Search
CPC ......... H04L 63/10; H04L 67/16; H04L 67/02; G06F 15/16; G06F 17/30528; G06F 21/73
(Continued)

(56) References Cited

U.S. PATENT DOCUMENTS 6,769,019 B2 *  7/2004  Ferguson ........... G06Q 30/0251
                                                        705/14.49
8,589,495 B1 *  11/2013  Beckert ................... G06F 9/542
                                                        709/204
(Continued)

FOREIGN PATENT DOCUMENTS

KR    2003-0068306 A    8/2003
KR    10-0948693 B1     3/2010
(Continued)

*Primary Examiner* — Tesfay Yohannes
(74) *Attorney, Agent, or Firm* — LRK Patent Law Firm

(57) ABSTRACT

A communication method and apparatus between heterogeneous platforms. A communication method of an interaction server that enables an interaction between a first platform server and a second platform server providing different platforms includes receiving, from the first platform server, a token request that includes first user identification information registered to the first platform server; transmitting, to the first platform server, a token that is created based on integrated user identification information corresponding to the first user identification information; receiving, from the second platform server, a request for verifying a validity of the token transferred from the first platform server to the second platform server; and transferring, to the second platform server in response to the validity of the token, second user identification information that corresponds to the integrated user identification information and is registered to the second platform server.

14 Claims, 12 Drawing Sheets

(51) Int. Cl.
*H04W 12/06* (2009.01)
*H04W 4/70* (2018.01)

(52) U.S. Cl.
CPC ......... *H04W 12/06* (2013.01); *H04L 67/2823* (2013.01); *H04W 4/70* (2018.02)

(58) Field of Classification Search
USPC .................................. 709/206, 219; 726/28
See application file for complete search history.

(56) References Cited

U.S. PATENT DOCUMENTS

| | | | |
|---|---|---|---|
| 9,219,736 B1* | 12/2015 | Lewis | H04L 63/102 |
| 2008/0141285 A1 | 6/2008 | Lee et al. | |
| 2009/0183250 A1* | 7/2009 | Harada | G06F 21/10 |
| | | | 726/9 |
| 2010/0222139 A1* | 9/2010 | Wang | G06Q 30/08 |
| | | | 463/29 |
| 2011/0321176 A1* | 12/2011 | Matsugashita | G06F 21/606 |
| | | | 726/28 |
| 2012/0109969 A1* | 5/2012 | Gil | G06F 16/951 |
| | | | 707/741 |
| 2014/0122198 A1* | 5/2014 | Cheung | G06Q 30/0211 |
| | | | 705/14.13 |
| 2014/0244833 A1 | 8/2014 | Sharma et al. | |
| 2017/0006392 A1* | 1/2017 | Pedersen | H04R 25/70 |
| 2017/0149867 A1* | 5/2017 | Lee | H04L 63/08 |
| 2017/0264681 A1* | 9/2017 | Apte | H04L 67/104 |

FOREIGN PATENT DOCUMENTS

| | | |
|---|---|---|
| KR | 10-1393432 B1 | 5/2014 |
| KR | 2014-0121179 A | 10/2014 |
| WO | 2015/020264 A1 | 2/2015 |

\* cited by examiner

METHOD AND APPARATUS FOR COMMUNICATION BETWEEN HETEROGENEOUS PLATFORMS

CROSS-REFERENCE TO RELATED APPLICATION(S)

This application claims the priority benefit of Korean Patent Application No. 10-2015-0162859, filed on Nov. 19, 2015, and Korean Patent Application No. 10-2016-0131915, filed on Oct. 12, 2016, in the Korean Intellectual Property Office, the disclosures of which are incorporated herein by reference for all purposes.

BACKGROUND

1. Field

One or more example embodiments relate to a method and apparatus for communication between heterogeneous platforms, and more particularly, to a communication method among an interaction server that enables an interaction between a first platform server and a second platform server providing different platforms, the first platform server, the second platform server, and a server.

2. Description of Related Art

With the increasing distribution of communication technology and popularization of smartphones, the expectation about Internet of things (IoT) is also increasing and a variety of techniques to embody the IoT have been developed. The IoT may allow all of the home appliances and communication devices used at home to be connected over the Internet and to collect and analyze a variety of information and to provide required information to a user.

Typically, a home appliance and a communication device are controllable through platforms provided from the respective corresponding manufacturers. Accordingly, if manufacturers of the home appliances and communication devices used at home are different, it may be difficult to control a home appliance and a communication device of different manufacturers.

SUMMARY

One or more example embodiments may effectively control a home appliance or a communication device used at home regardless of a different manufacturer through interaction between platform servers providing different platforms.

One or more example embodiments may change integrated user identification information based on a time, may create a token based on the integrated user identification information only in response to a request for the token from a first platform server, and accordingly may maintain a relatively high security even though platform servers providing different platforms interact with each other.

According to an aspect, there is provided a communication method of an interaction server that enables an interaction between a first platform server and a second platform server providing different platforms, the method including receiving, from the first platform server, a token request that includes first user identification information registered to the first platform server; transmitting, to the first platform server, a token that is created based on integrated user identification information corresponding to the first user identification information; receiving, from the second platform server, a request for verifying a validity of the token transferred from the first platform server to the second platform server; and transferring, to the second platform server in response to the validity of the token, second user identification information that corresponds to the integrated user identification information and is registered to the second platform server.

The token that is created based on the integrated user identification information may be created by encoding the integrated user identification information that varies based on a time.

Each of the first user identification information and the second user identification information may be information for identifying the same user that joins the first platform server and the second platform server, and the integrated user identification information may be mapped to the first user identification information and the second user identification information.

The communication method of the interaction server may further include receiving, from the first platform server, an another-platform interaction request including the first user identification information; transmitting, to the first platform server, a platform list of platforms interacting with the first platform server and transaction identification information that is created based on the integrated user identification information; receiving the second user identification information and the transaction identification information from the second platform server, in response to a successful login into the second platform server through the platform list; and mapping the second user identification information to the integrated user identification information and the first user identification information in response to a validity of the transaction identification information.

The mapping may include receiving the transaction identification information from the second platform server before a valid time of the transaction identification information expires, and mapping the second user identification information to the integrated user identification and the first user identification information in response to the transaction identification information being determined to be valid.

The platform list may include a federation uniform resource locator (URL) that provides an interface for logging in a platform interacting with the first platform server.

According to an aspect, there is provided a communication method of a first platform server that interacts with a second platform server providing a different platform through an interaction server, the method including transmitting, to the interaction server, a token request that includes first user identification information registered to the first platform server; receiving, from the interaction server, a token that is created based on integrated user identification information corresponding to the first user identification information; transmitting, to the second platform server, the token and a request for a device registered to the second platform server; and receiving a result of processing the request for the device from the second platform server. The second platform server is configured to transmit the result of processing the request for the device to the first platform server, in response to receiving second user identification information that corresponds to the integrated user identification information and is registered to the second platform server, from the interaction server that determines a validity of the token transferred from the first platform server to the second platform server.

The request for the device may include a request for at least one of a device list of devices registered to the second platform server, a control of the device, and an event subscription of the device.

The communication method of the first platform server may further include transmitting, to the interaction server, an another-platform interaction request that includes the first user identification information; receiving, from the interaction server, a platform list of platforms interacting with the first platform server and transaction identification information that is created based on the integrated user identification information; and transmitting login information associated with the second platform server and the transaction identification information through the platform list. The second user identification included in the login information may be transmitted from the second platform server to the interaction server in response to a successful login into the second platform server, and is mapped to the integrated user identification information and the first user identification information.

The token that is created based on the integrated user identification information may be created by encoding the integrated user identification information that varies based on a time.

Each of the first user identification information and the second user identification information may be information for identifying the same user that joins the first platform server and the second platform server, and the integrated user identification information may be mapped to the first user identification information and the second user identification information.

According to an aspect, there is provided a communication method of a second platform server that interacts with a first platform server providing a different platform through an interaction server, the method including receiving, from the first platform server, a token and a request for a device registered to the second platform server, the token being created based on integrated identification information corresponding to first user identification information registered to the first platform server in response to a request of the first platform server; transmitting, to the interaction server, a request for verifying a validity of the token; and receiving second user identification information that corresponds to the integrated user identification information and is registered to the second platform server, from the interaction server that determines the token to be valid.

The token that is created based on the integrated user identification information may be created by encoding the integrated user identification information that varies based on a time.

The request for the device may include a request for at least one of a device list of devices registered to the second platform server, a control of the device, and an event subscription of the device.

The communication method of the second platform server may further include transmitting a result of processing the request for the device to the first platform server together with identification information of the device and identification information of the second platform server.

The communication method of the second platform server may further include receiving, from the first platform server that requests an interaction with another platform, login information associated with the second platform server and transaction identification information corresponding to the integrated user identification information; and transmitting the transaction identification information and the second user identification information to the interaction server in response to a successful login into the second platform server based on the login information. The second user identification information may be mapped to the integrated user identification information and the first user identification information through the interaction server that determines the transaction identification information received from the second platform server to be valid.

Each of the first user identification information and the second user identification information may be information for identifying the same user that joins the first platform server and the second platform server, and the integrated user identification information may be mapped to the first user identification information and the second user identification information.

According to an aspect, there is provided an interaction server for an interaction between a first platform server and a second platform server providing different platforms, the interaction server including a memory configured to store a communication method and a processor configured to perform the communication method. The processor is configured to receive, from the first platform server, a token request that includes first user identification information registered to the first platform server, to transmit, to the first platform server, a token that is created based on integrated user identification information corresponding to the first user identification information, to receive, from the second platform server, a request for verifying a validity of the token transferred from the first platform server to the second platform server, and to transfer, to the second platform server, second user identification information that corresponds to the integrated user identification information and is registered to the second platform server.

According to example embodiments, although manufacturers are different, it is possible to effectively control a home appliance or a communication device used at home through an interaction between platform servers providing different platforms.

Also, according to example embodiments, although platform servers providing different platforms interact with each other, it is possible to maintain a relatively high security by changing integrated user identification information based on a time and by creating a token based on the integrated user identification information only in response to a request for the token from a first platform server.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
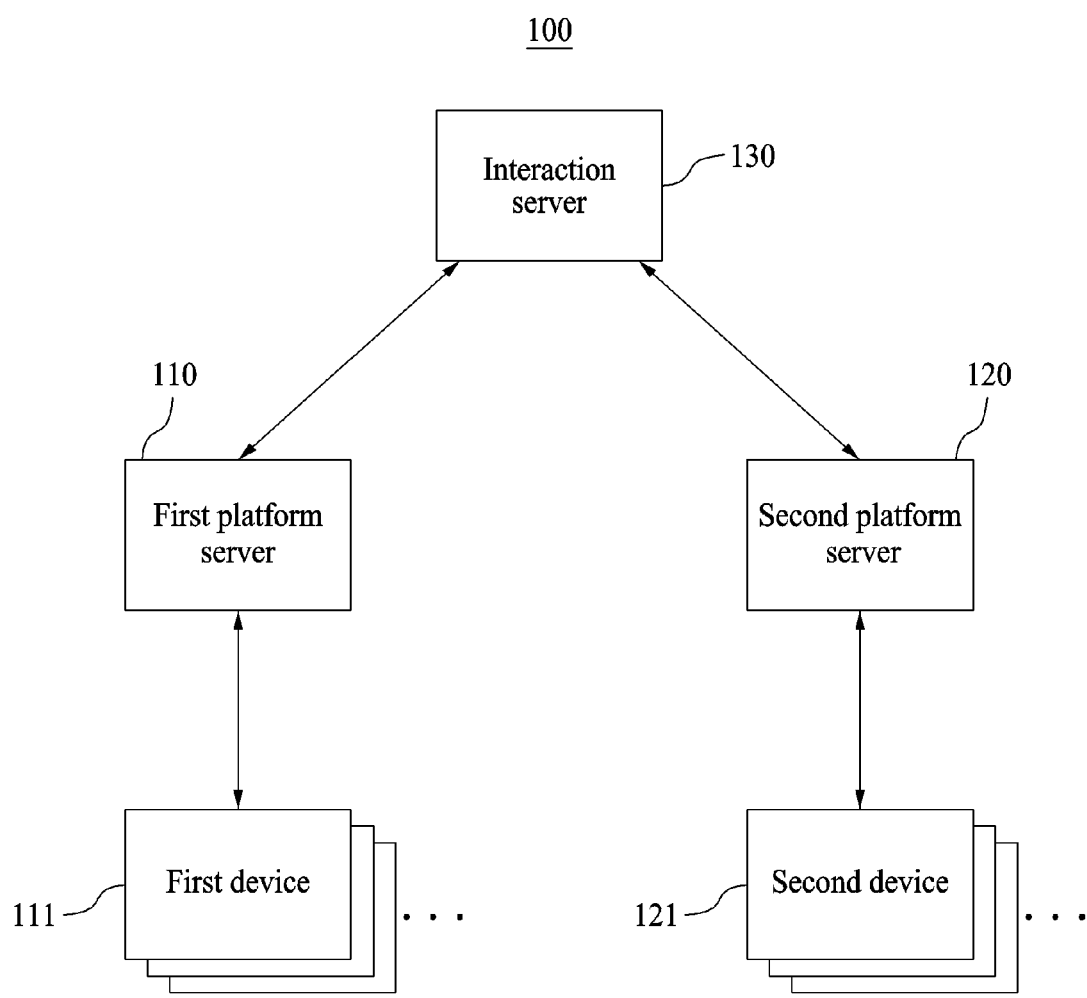
FIG. 1 is a diagram illustrating a home network system including a first platform server, a second platform server, and an interaction server according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

The example embodiments may be employed for an interaction between a first platform server and a second platform server providing different platforms. Hereinafter, an operation for the interaction between the first platform server and the second platform server may include an operation of an interaction server that enables the interaction between the first platform server and the second platform server, an operation of each of the first platform server and the second platform server, and an operation of a device registered to the first platform server or the second platform server. Hereinafter, the example embodiments will be described. Like reference numerals refer to like elements throughout.

FIG. 1 is a diagram illustrating a home network system including a first platform server, a second platform server, and an interaction server according to an example embodiment.

A home network system 100 according to an example embodiment may include at least one electronic device and/or communication device (hereinafter, referred to as a device), and communication between devices may be enabled through a predetermined platform. Here, devices using different platforms may be present in the home network system 100. In this case, an operation for interaction between the different platforms may be performed in advance for communication between the devices.

Hereinafter, the example embodiment is described based on an example in which different two platforms interact with each other. However, it is only an example and the number of interacting platforms is not limited and the example embodiment may be applicable even to a case in which at least three platforms interact with one another.

Referring to FIG. 1, the home network system 100 may include a first platform server 110, a first device 111, a second platform server 120, a second device 121, and an interaction server 130.

The first platform server 110 and the second platform server 120 are servers that provide different platforms. At least one first device 111 may be registered to the first platform server 110. The first device 111 may communicate with another first device 111 through the first platform server 110. The first device 111 may perform communication through the first platform server 110, and may be provided in various types of products, for example, a personal computer (PC), a laptop computer, a tablet computer, a smartphone, a smart home appliance, such as a smart television (TV), a smart refrigerator, a smart illumination device, a smart air conditioner, a smart washing machine, a smart robot cleaner, a smart temperature sensor, etc., a smart vehicle, a wearable device, and the like. Here, a plurality of first devices 111 that performs communication through the first platform server 110 may be devices that are connected to the same user identification information registered to the first platform server 110. The user identification information indicates a user identification (ID) and, in the following, identification information and ID may be interchangeably used for clarity of description.

At least one second device 121 may be registered to the second platform server 120. The second device 121 may refer to a device that communicates with another second device 121 through the second platform server 120, and may be provided in various types of products, for example, a PC, a laptop computer, a tablet computer, a smartphone, a smart home appliance, a smart vehicle, a wearable device, and the like. Similarly, a plurality of second devices 121 that performs communication through the second platform server 120 may be devices that are connected to the same user identification information registered to the second platform server 120.

In this instance, since the first device 111 and the second device 121 are connected to different platform servers, respectively, communication may be impossible using only one of the first platform server 110 and the second platform server 120. Accordingly, all of the first platform server 110 and the second platform server 120 need to be employed for communication between the first device 111 and the second device 121. To this end, the interaction server 130 is required for the interaction between the first platform server 110 and the second platform server 120.

The interaction server 130 refers to a server that enables the interaction between the first platform server 110 and the second platform server 120 providing different platforms, and enables communication between the first device 111 registered to the first platform server 110 and the second device 121 registered to the second platform server 120 through the interaction between the first platform server 110 and the second platform server 120. That is, the first device 111 may control the second device 121 through the interaction server 130. For example, a user may verify whether the second device 121, for example, a smart TV, a smart air conditioner, etc., is ON or OFF, or may control the second device 121 to perform a specific operation through the first device 111, for example, a smartphone. Here, user identification information registered at the first device 111 to the first platform server 110 may correspond to user identification information registered at the second device 121 to the second platform server 120.

Figure 2:
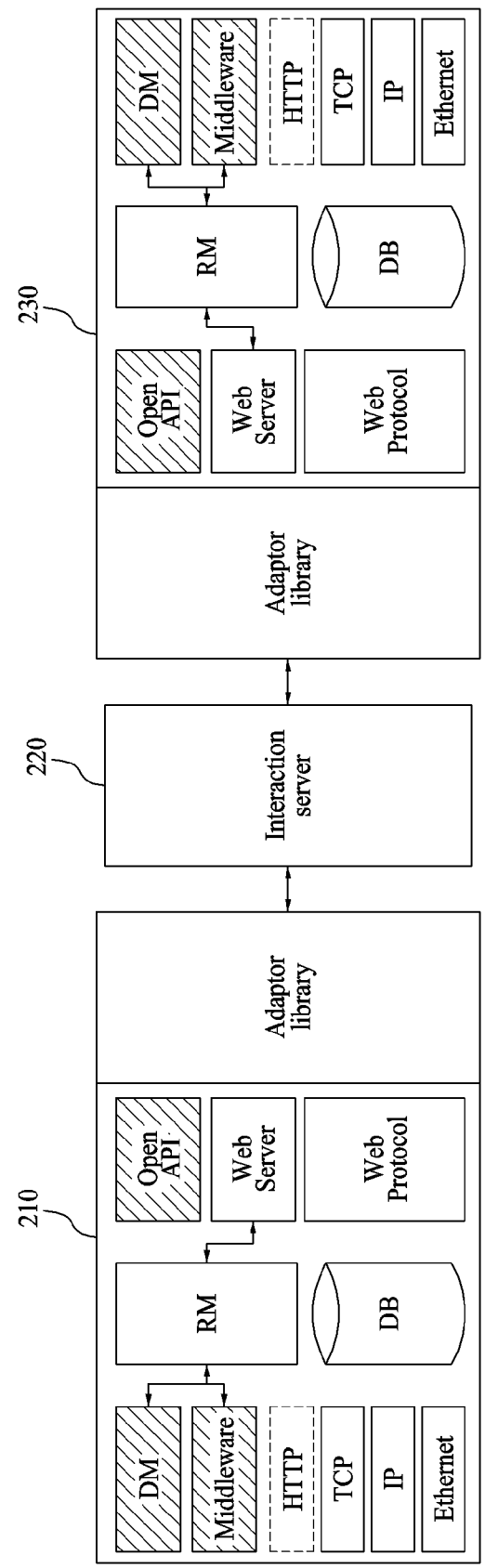
FIG. 2 is a diagram illustrating a configuration of a first platform server, a second platform server, and an interaction server according to an example embodiment.

FIG. 2 is a diagram illustrating a configuration of a first platform server, a second platform server, and an interaction server according to an example embodiment.

FIG. 2 illustrates a first platform server 210, an interaction server 220, and a second platform server 230.

The first platform server 210 refers to a device that provides a platform, and may include, for example, a device manager (DM), a middleware, a resource manager (RM), a database (DB), an open application programming interface (API), an adaptor library, a data format converter, and the like. Here, the DM may be a manager that manages a device registered to the first platform server 210, the middleware may be a protocol that retrieves, controls, and senses a device through a home network, and the RM may be a manager that manages information created at the device. Also, the DB may be a device that stores data associated with information created at the device, and the open API may control each device or manage a user at each platform.

The adaptor library may be a library that converts a message used at the first platform server 210 to a standard message commonly used at the first platform server 210 and the interaction server 220, or that converts the standard message to the message used at the first platform server 210. When the message is converted at the adaptor library, first user identification information and first device identification information registered to the first platform server 210 may be converted.

The data format converter may convert a format of data. For example, a data format used between the first platform server 210 and a first device may differ from a data format used between the first platform server 210 and the interaction server 220. Accordingly, the data format converter may convert data to transfer data received from the first device to the interaction server 220 or to transfer data received from the interaction server 220 to the first device.

The interaction server 220 may perform an authentication operation and a routing operation for the interaction between the first platform server 210 and the second platform server 230 providing different platforms. The interaction server 220 may match and thereby manage the first user identification information registered to the first platform server 210 and second user identification information registered to the second platform server 230. For example, the interaction server 220 may integrally manage the first user identification information and the second user identification information by creating integrated user identification information and by mapping the first user identification and the second user identification information to the created integrated user identification.

Also, the interaction server 220 may support data transmission and reception between the first platform server 210 and the second platform server 230 for the routing operation.

The second platform server 230 refers to a device that provides a platform different from the first platform server 210. The description made about the first platform server 210 may be applicable to a configuration of the second platform server 230.

Figure 3:
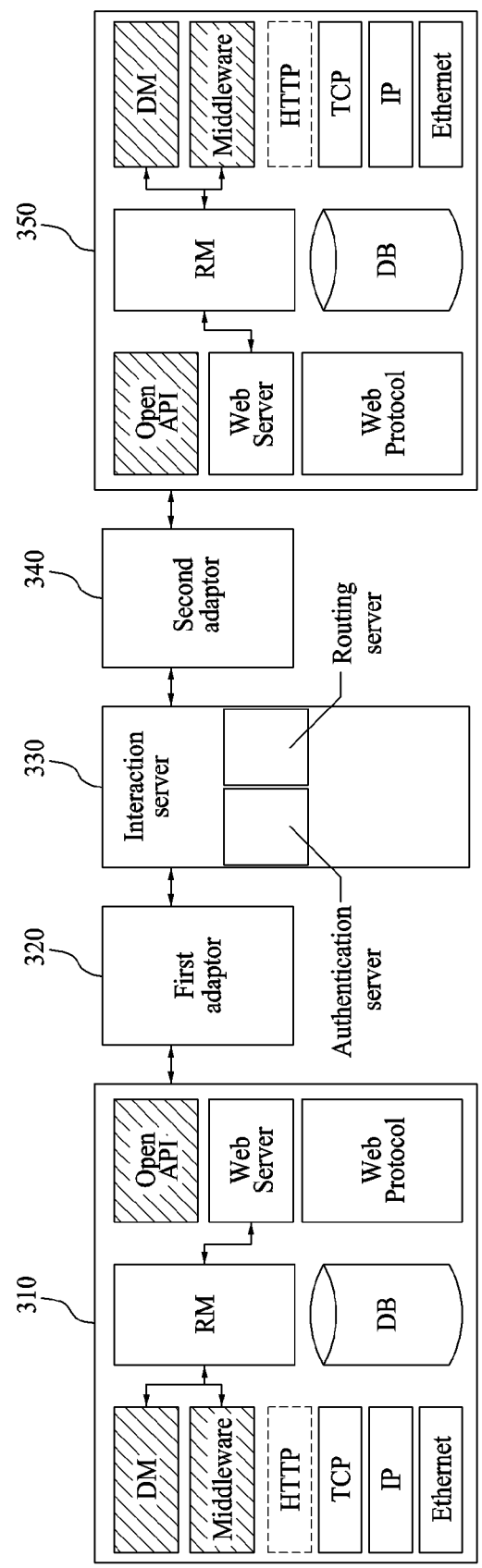
FIG. 3 is a diagram illustrating a configuration of a first platform server, a second platform server, and an interaction server according to another example embodiment.

FIG. 3 is a diagram illustrating a configuration of a first platform server, a second platform server, and an interaction server according to another example embodiment.

FIG. 3 illustrates a first platform server 310, a first adaptor 320, an interaction server 330, a second adaptor 340, and a second platform server 350.

Depending on example embodiments, the data format converter and the adaptor library included in the first platform server 210 may be configured as a separate device distinguished from the first platform server 310. That is, the first adaptor 320 distinguished from the first platform server 310 may perform an operation of the data format converter and the adaptor library of FIG. 2. Similarly, the second platform server 350 and the second adaptor 340 may be configured as a separate device.

Also, the interaction server 330 may include a separate authentication server and routing server. That is, the authentication server may perform the authentication operation of the interaction server 220 and the routing server may perform the routing operation of the interaction server 220.

Figure 4:
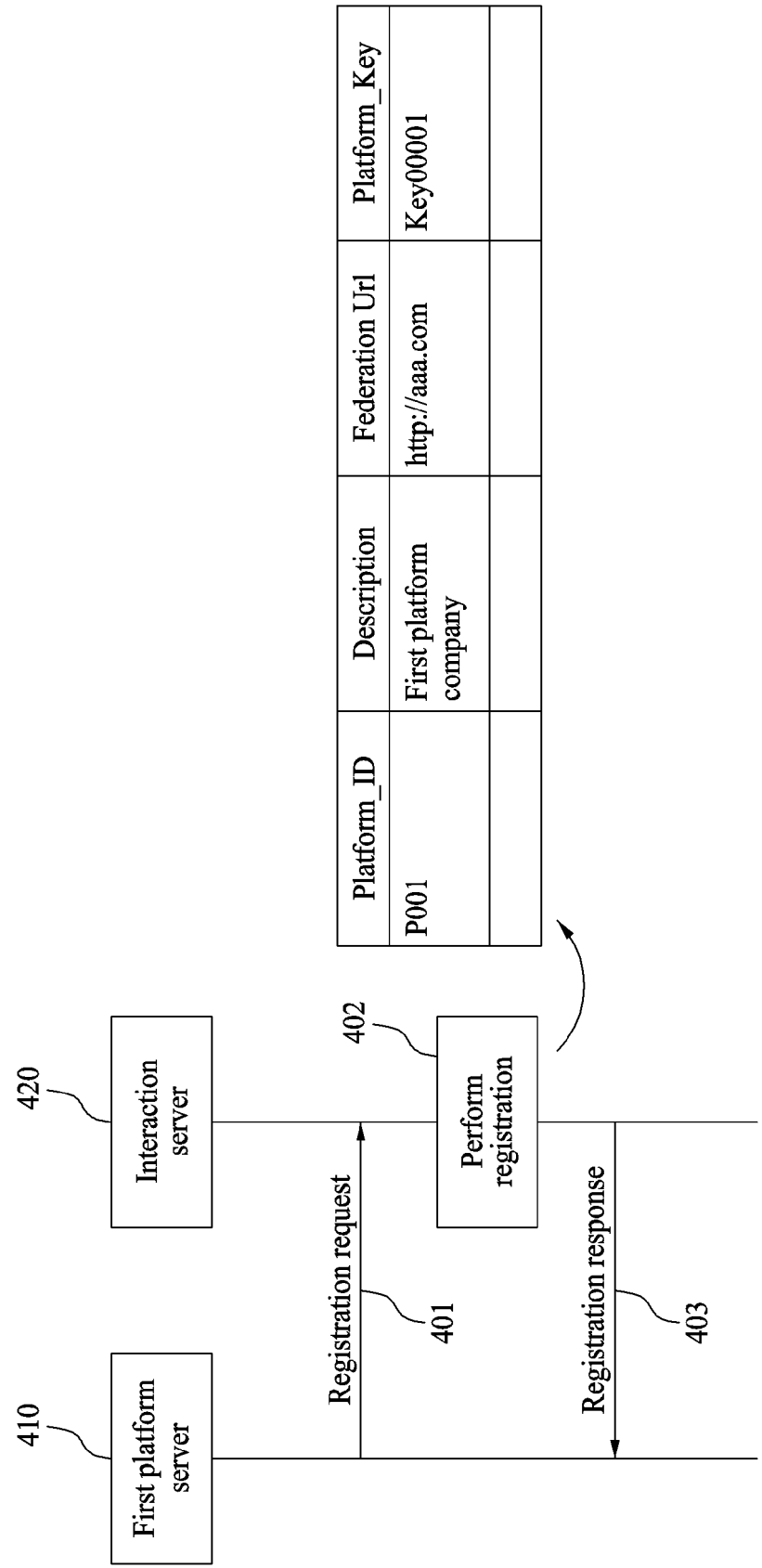
FIG. 4 illustrates a process of registering a platform server to an interaction server according to an example embodiment.
Figure 5:
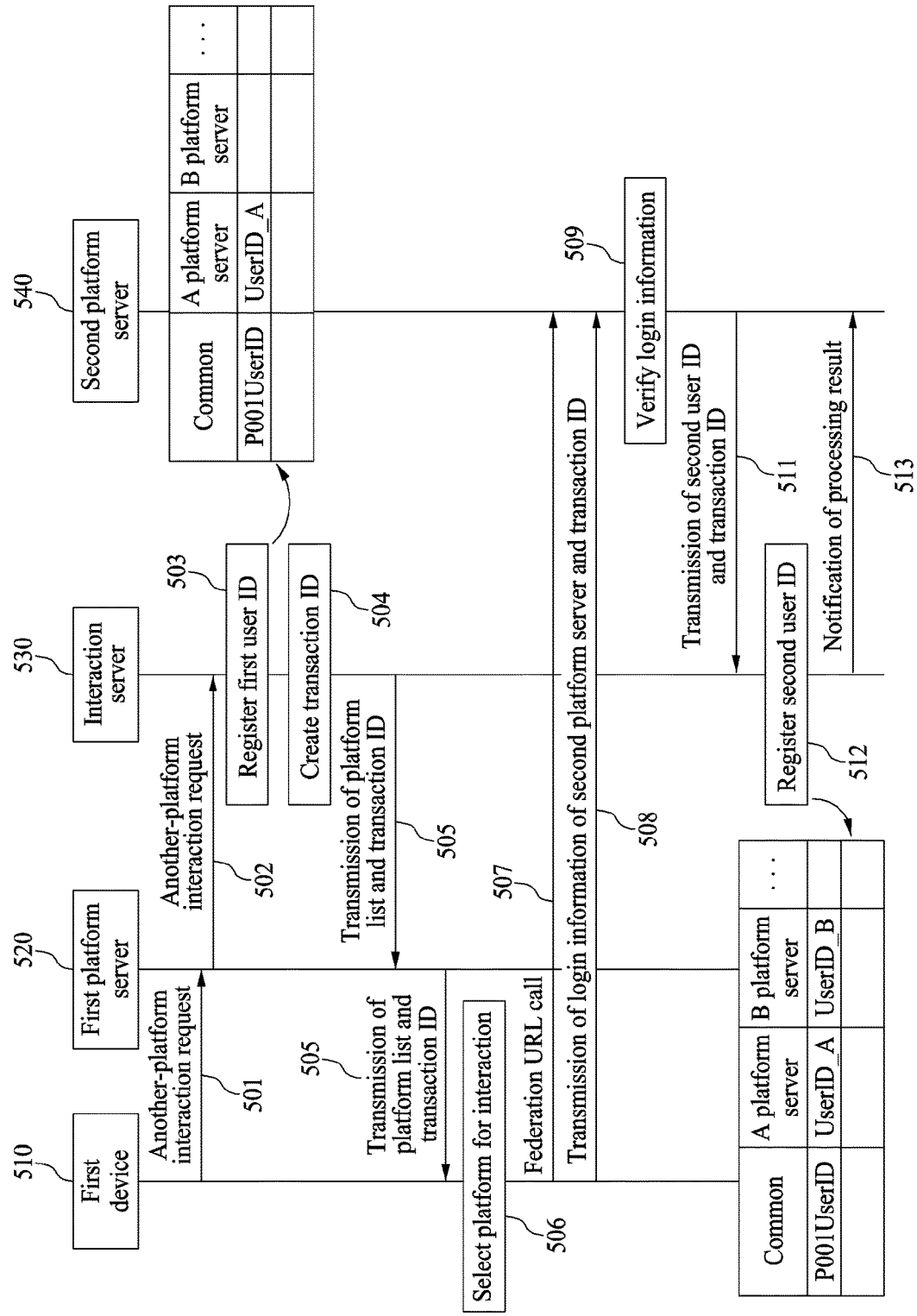
FIG. 5 illustrates a process for an interaction between a first platform server and a second platform server according to an example embodiment.
Figure 6:
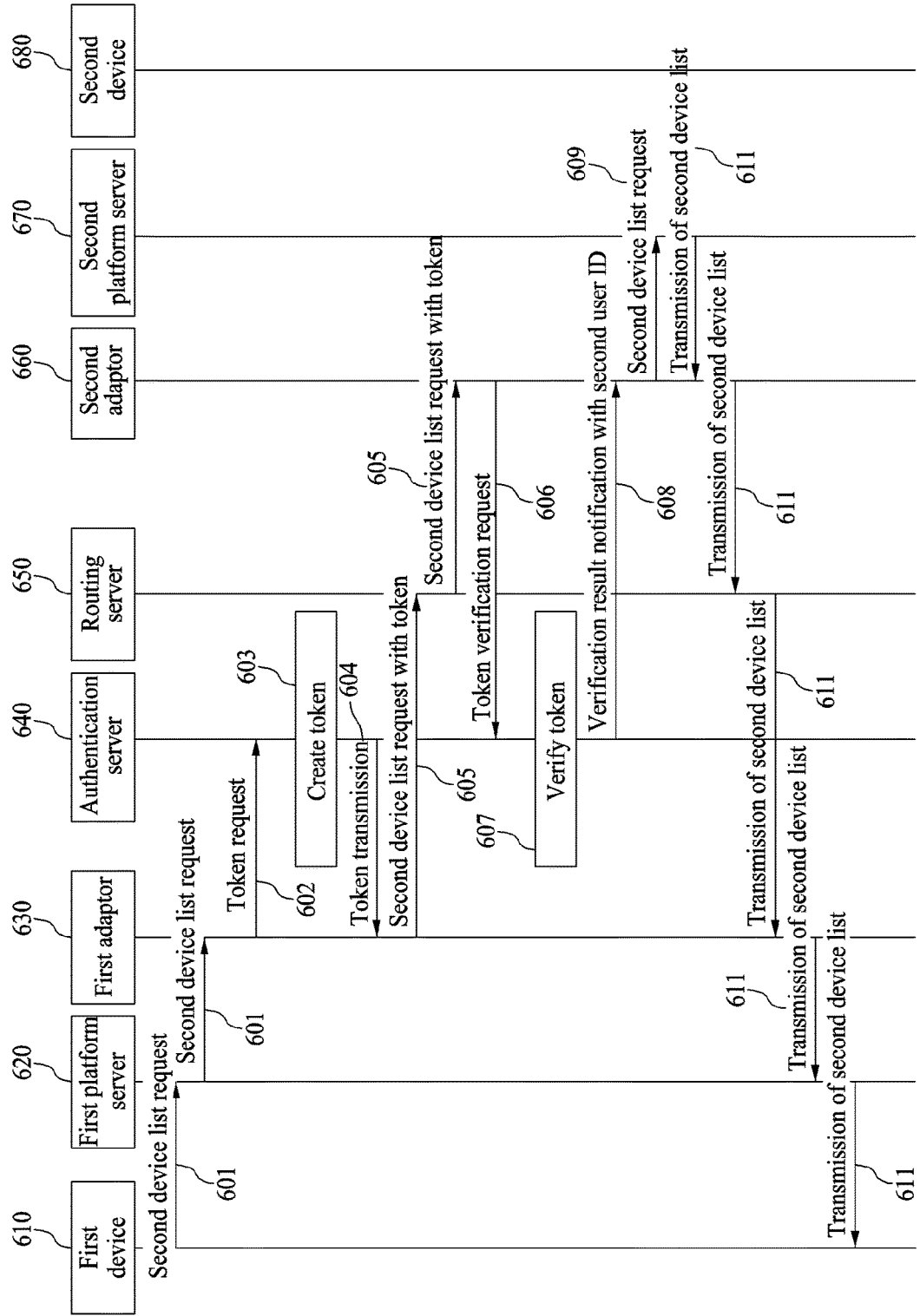
FIG. 6 illustrates a process of requesting a device list of devices registered to another platform server according to an example embodiment.
Figure 7:
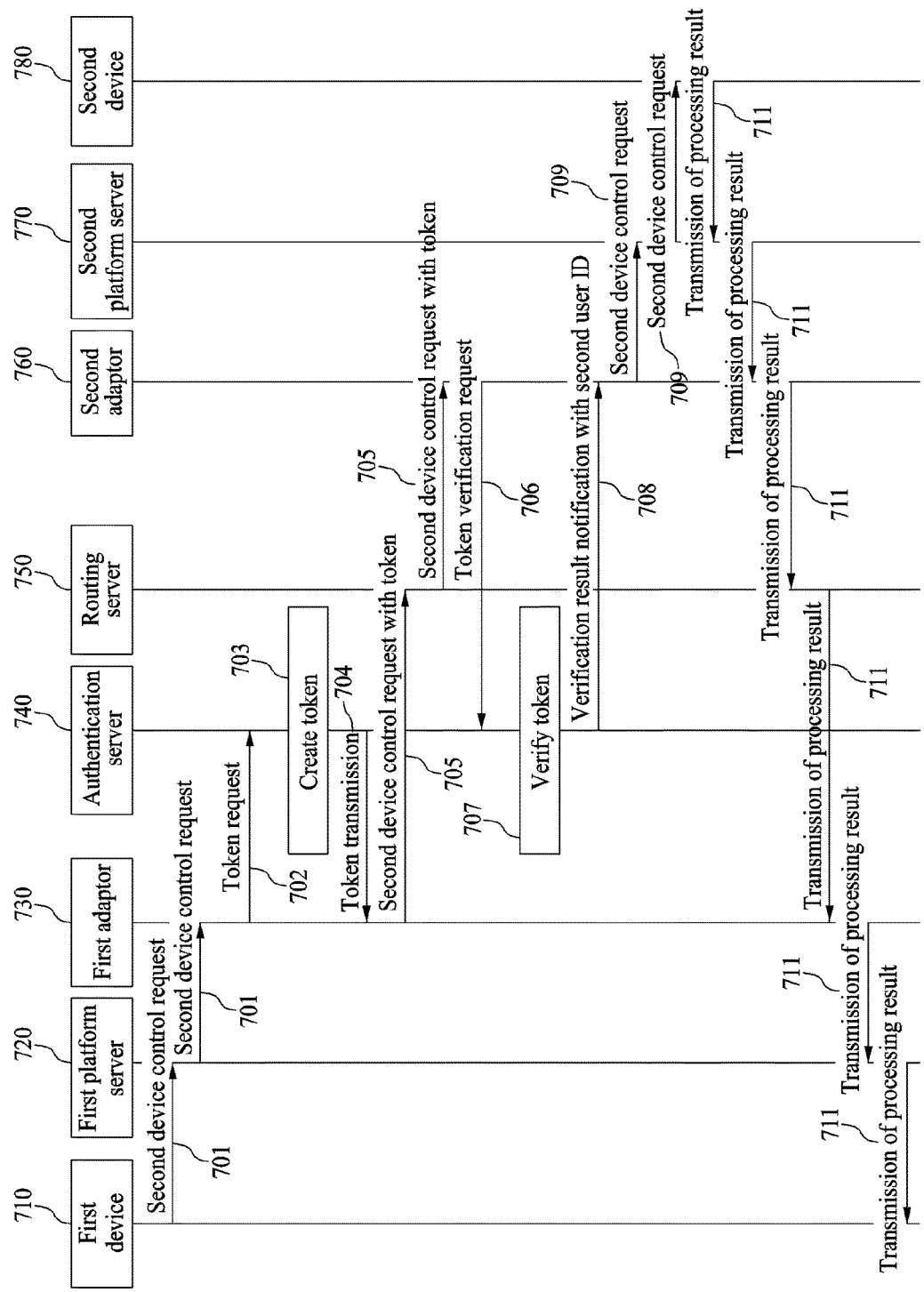
FIG. 7 illustrates a process of requesting a control of a device registered to another platform server according to an example embodiment.
Figure 8:
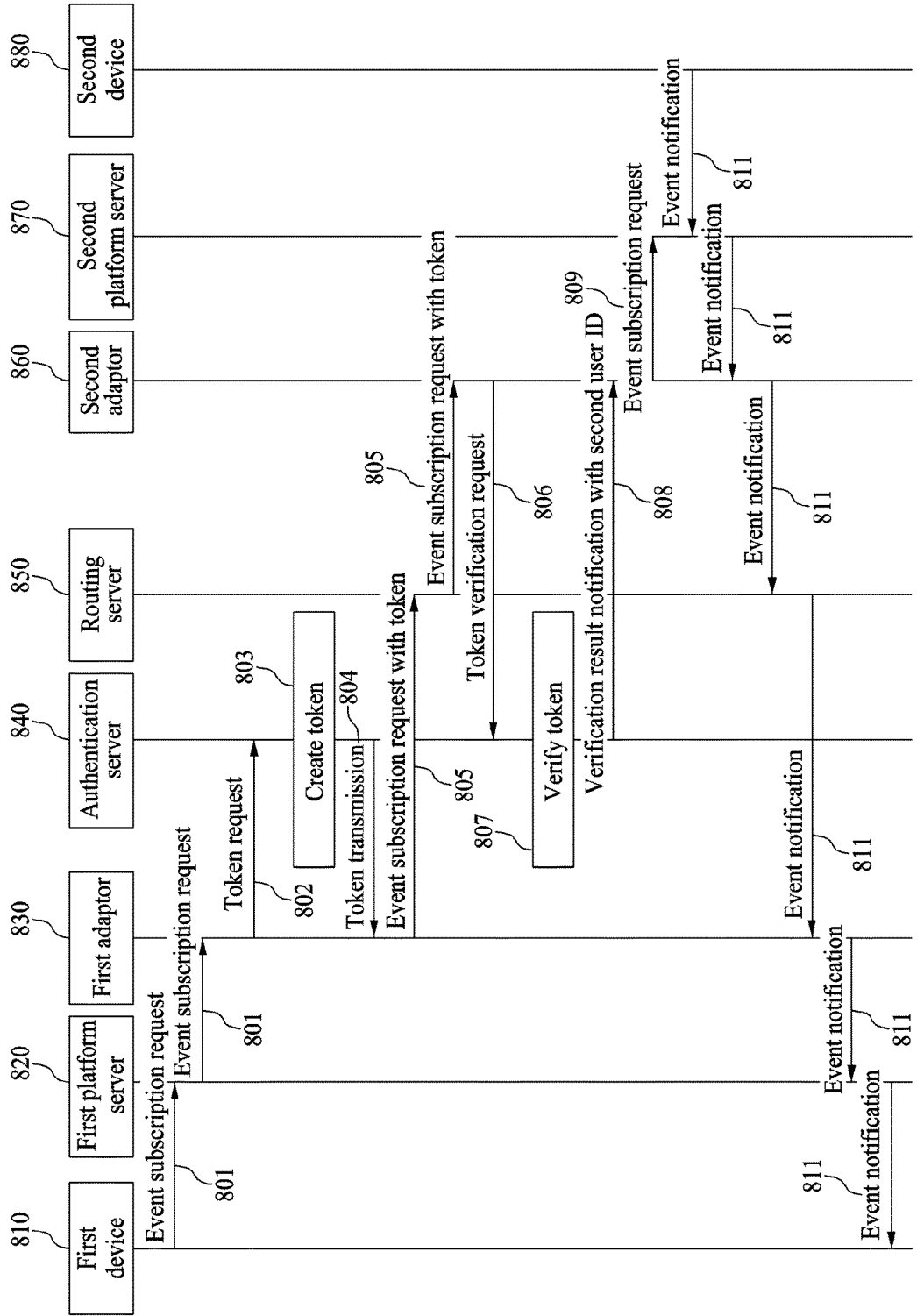
FIG. 8 illustrates a process of requesting a driving of an event about a device registered to another platform server according to an example embodiment.

Hereinafter, FIGS. 4 and 5 are described based on a case in which an adaptor library is included in a platform server and an authentication server and a routing server are included in an interaction server, which is the same as FIG. 2. FIGS. 6 through 8 are described based on a case in which a platform server and an adaptor are separate and an interaction server is divided into an authentication server and a routing server. However, it is only for clarity of description and thus, the description of FIG. 2 and the description of FIG. 3 may be applicable to other cases.

FIG. 4 illustrates a process of registering a platform server to an interaction server according to an example embodiment.

An operation of registering a platform server to an interaction server 420 for an interaction between different platform servers is described with reference to FIG. 4.

In operation 401, a first platform server 410 may request the interaction server 420 for a registration. For example, the first platform server 410 may request the registration by transmitting a description about the first platform server 410 and a federation uniform resource locator (URL) to the interaction server 420. Here, the federation URL refers to an URL used to authenticate a user using a platform provided from the first platform server 410. An interface for logging in a corresponding platform may be provided through the federation URL. Also, the description about the first platform server 410 may include information about a company that operates the first platform server 410, a communication scheme used at the first platform server 410, information about a data structure, and the like.

In operation 420, the interaction server 420 may register the first platform server 410 in response to the registration request of the first platform server 410. For example, the interaction server 420 may store Platform_ID, a description, a federation URL, and Platform_Key in a predetermined table. Here, Platform_ID is platform identification information indicating a platform, and the description includes information about a company that provides the corresponding platform, the communication scheme used at the corresponding platform, information about the data structure, and the like. Platform_Key refers to a key for platform authentication and may be used to initially register the corresponding platform. The interaction server 420 may manage and maintain information registered to the table.

In operation 403, the interaction server 420 may transmit a response indicating that the first platform server 410 is registered. For example, the interaction server 420 may transfer, to the first platform server 410, a session key for transmitting and receiving data to and from the first platform server 410.

FIG. 5 illustrates a process for an interaction between a first platform server and a second platform server according to an example embodiment.

Hereinafter, an operation for an interaction between a first platform server 520 and a second platform server 540 in response to a request of a user input to a first device 510 is described with reference to FIG. 5.

In operation 501, the first device 510 may transmit an another-platform interaction request input from the user to the first platform server 520. For example, the user may input an instruction for the another-platform interaction request by inputting a predetermined touch on a touch screen of the first device 510 or by pushing a button of the first device 510. The first device 510 may transmit the another-platform interaction request to the first platform server 520 under control of the user.

In operation 502, the first platform server 520 may transfer the another-platform interaction request to an interaction server 530. For example, the first platform server 520 may include a first user ID registered to the first platform server 520 in the another-platform interaction request and thereby transmit the same to the interaction server 530.

In operation 503, the interaction server 530 may register the first user ID. For example, the interaction server 530 may verify whether the first user ID received from the first platform server 520 is registered to a mapping table, and if the first user ID is not registered, may create an integrated user ID corresponding to the first user ID and may register the first user ID in association with the integrated user ID. Here, the integrated user ID refers to a user ID for an interaction between different platform servers and may be mapped to a user ID registered to each platform server and thereby managed. If the first user ID is registered to the mapping table, operation 503 may be omitted In operation 504, the interaction server 530 may create a transaction ID corresponding to the integrated user ID. The transaction ID refers to information for verifying that user IDs registered to different platforms correspond to the same user, and may have a relatively short valid time to prevent mapping between irrelevant user IDs.

In operation 505, the interaction server 530 may transmit a platform list of platforms interacting with the first platform server 520 and the transaction ID to the first platform server 520. The first platform server 520 may transfer the platform list and the transaction ID to the first device 510. Here, the platform list may include a federation URL of a platform capable of interacting with the first platform server 520. Further, the platform list may further include a description about the corresponding platform, such as a platform name and the like.

In operation 506, the first device 510 may provide the platform list to the user and may receive a selection on a platform for interaction from among the platforms included in the platform list from the user.

In operation 507, the first device 510 may transmit a federation URL call to the second platform server 540 that provides a platform selected by the user. In response to the federation URL call transmitted to the second platform server 540, the first device 510 displays a login screen about the second platform server 540 and the user may input login information, for example, a second user ID, a password, etc., registered to the second platform server 540 on the displayed login screen.

In operation 508, the first device 510 may transmit the transaction ID and login information of the second platform server 540 to the second platform server 540.

In operation 509, the second platform server 540 may verify the login information received from the first device 510. The second platform server 540 may determine whether the user having requested the interaction is a user registered to the second platform server 540 by verifying the login information. In response to a successful login through the login information received from the first device 510, the second platform server 540 may verify that the corresponding login information is appropriate.

In response to the successful log in the second platform server 540, the second platform server 540 may transmit the transaction ID and a second user ID included in the login information to the interaction server 530 in operation 511.

In operation 512, the interaction server 530 may register the second user ID to the mapping table based on the transaction ID. The interaction server 530 may verify the transaction ID received from the second platform server 540. For example, the interaction server 530 may determine whether the transaction ID received from the second platform server 540 is valid and, if the transaction ID is valid, may register the second user ID to the mapping table in association with the user ID. If the transaction ID is invalid due to elapse of a predetermined valid time or if the transaction ID is invalid due to modification of the transaction ID, etc., during communication, the interaction server 530 may not register the second user ID to the mapping table.

In operation 513, the interaction server 530 may notify the second platform server 540 about a processing result of operation 512. Also, depending on example embodiments, the interaction server 530 may notify the first device 510 having requested the interaction with another platform about the processing result.

FIG. 6 illustrates a process of requesting a device list of devices registered to another platform server according to an example embodiment.

A process of requesting, at a first device 610, a second device list registered to a second platform server 670 is described with reference to FIG. 6.

Prior to controlling a second device 680, the first device 610 may request the second device list registered to the second platform server 670.

In operation 601, the first device 610 may transfer the second device list request to a first platform server 620. The first platform server 620 may transfer the second device list request to a first adaptor 630.

In operation 602, the first adaptor 630 may request a token, for example, an access token for the second device list request to an authentication server 640. The first adaptor 630 may transfer, to the authentication server 640, identification information of the first platform server 620 having requested the second device list, identification information of the second platform server 670 registered at the second device 680, and a first user ID indicating a user having requested the second device list together with the token request.

In operation 603, the authentication server 640 may create a token in response to the token request of the first adaptor 630. For example, the authentication server 640 may create the token by encoding an integrated user ID corresponding to the first user ID. Here, the integrated user ID may vary based on a time. Accordingly, a different integrated user ID may be determined based on a point in time at which the token is created. For example, the integrated user ID may be periodically changed.

Since the integrated user ID is changed based on a time, the token created by encoding the integrated user ID may also be changed based on a time. For example, a token crated at a first point in time and a token created at a second point in time may be created based on different integrated user IDs, respectively. The token created at the first point in time and the token created at the second point in time may be different from each other. Here, the first point in time and the second point in time denote points in times between which a predetermined temporal interval is present. Accordingly, if a predetermined period of time is elapsed, a new token is used despite of leakage of a previously created token. Thus, it is possible to maintain relatively high security in interaction between different platforms.

In operation 604, the authentication server 640 may transmit the created token to the first adaptor 630.

In operation 605, the first adaptor 630 may transmit the token to a routing server 650 together with the second device list request. The first adaptor 630 may encode and transmit the second device list request using a key interpretable at only the second platform server 670. For example, the first adaptor 630 may encode the second device list request using a public key of the second platform server 670, so that an apparatus, for example, the routing server 650, etc., except from the second platform server 670 may not verify the second device list request. The routing server 650 may transfer the second device list request and the token to a second adaptor 660.

In operation 606, the second adaptor 660 may request the authentication server 640 to verify whether the received token is valid. Here, the second adaptor 660 may transmit the received token to the authentication server 640.

In operation 607, the authentication server 640 may verify whether the token received from the second adaptor 660 is valid. For example, if the corresponding token corresponds to the token created in operation 603, the authentication server 640 may determine that the corresponding token is valid. If the corresponding token is valid, the authentication server 640 may extract the integrated user ID from the token based on an encryption key used to create the token in operation 603.

In operation 608, the authentication server 640 may notify the second adaptor 660 about the verification result. If the corresponding token is valid, the authentication server 640 may transmit, to the second adaptor 660, a message indicating that the corresponding token is valid and a second user ID corresponding to the integrated user ID. If the corresponding token is invalid, the authentication server 640 may transmit, to the second adaptor 660, only a message indicating that the corresponding token is invalid.

In operation 609, in response to the message indicating that the corresponding token is valid, the second adaptor 660 may request the second platform server 670 for the second device list. Here, the second adaptor 660 may transmit the second device list request together with the second user ID received from the authentication server 640.

In operation 611, the second platform server 670 may transmit the second device list included in the second device 680 to the second adaptor 660. Here, the second device 680 may indicate a device that is registered to the second platform server 670 to correspond to the second user ID. For example, the second device list may include a second device ID in a format of "DeviceID".

The second adaptor 660 may transfer the second device list to the routing server 650. Here, the second adaptor 660 may merge the second device ID included in the second device list with an ID of the second platform server 670. The second device list may include the second device ID in a format of "PlatformID@DeviceID".

The routing server 650 may transfer the second device list to the first adaptor 630, the first adaptor 630 may transfer the second device list to the first platform server 620, and the first platform server 620 may transfer the second device list to the first device 610. The first device 610 may provide the second device list to the user. Here, the first platform server 620 may use the second device ID in the format of "PlatformID@DeviceID" determined at the second adaptor 670 as is, or may change and use the second device ID with the ID of only the first platform server 620.

FIG. 7 illustrates a process of requesting a control of a device registered to another platform server according to an example embodiment.

A process of requesting, at a first device 710, control of a second device 780 is described with reference to FIG. 7.

A user may control an operation of the second device 780 through the first device 710. Here, the second device 780 may be a device included in the second device list acquired with the method of FIG. 6. For example, the user may turn ON a smart air conditioner corresponding to the second device 780 or may turn OFF a smart illumination corresponding to the second device 780 through the first device 710.

In operation 701, the first device 710 may transmit a request for controlling the second device 780 to a first platform server 720. Here, the first device 710 may transmit, to the first platform server 720, a second device ID that is information indicating the second device 780 together with the second device control request. Here, the second device ID may include not only an ID of the second device 780 but also an ID of a second platform server 770, for example, a second device ID in a format of "PlatformID@DeviceID".

The first platform server 720 may transfer the second device control request to the first adaptor 730.

In operation 702, the first adaptor 730 may request an authentication server 740 for a token for the second device control request. The first adaptor 730 may transfer, to the authentication server 740, identification information of the first platform server 710 requesting the second device control, identification information of the second platform server 770 registered at the second device 780, and a first user ID indicating a user requesting the second device list together with the token request.

In operation 703, the authentication server 740 may create a token in response to the token request. The authentication server 740 may create the token by encoding an integrated user ID corresponding to the first user ID. Here, the integrated user ID may be determined to be different based on a time. That is, the integrated user ID may be determined to be different based on a point in time at which the token is created. Further, since the integrated user ID is determined to be different based on a time, the token may be determined to be different based on a time.

In operation 704, the authentication server 740 may transmit the created token to the first adaptor 730.

In operation 705, the first adaptor 730 may transmit the second device control request to a routing server 750 together with the token. The routing server 750 may transfer the second device control request and the token to a second adaptor 760.

In operation 706, the second adaptor 760 may request the authentication server 740 to verify whether the received token is valid. Here, the second adaptor 760 may transmit the received token to the authentication server 740.

In operation 707, the authentication server 740 may verify whether the token received from the second adaptor 760 is valid. If the corresponding token is valid, the authentication server 740 may extract the integrated user ID from the token based on an encryption key used to create the token in operation 703.

In operation 708, the authentication server 740 may notify the second adaptor 760 about the verification result. If the corresponding token is valid, the authentication server 740 may transmit, to the second adaptor 760, a message indicating that the corresponding token is valid and a second user ID corresponding to the integrated user ID.

In operation 709, in response to receiving the message indicating that the corresponding token is valid, the second adaptor 760 may transmit the second device control request to the second platform server 770. Here, the second adaptor 760 may also transmit the second user ID received from the authentication server 740. The second adaptor 760 may transfer, to the second platform server 770, a remaining in which an ID of the second platform server 770 is removed from an ID of the second device 780 that is a control target, for example, a second device ID in a format of "DeviceID".

The second platform server 770 may identify the second device 780 that is registered in association with the second user ID and corresponds to the second device ID, and may request the identified second device 780 for control.

If the second device 780 performs a predetermined operation in response to the control request, the second device 780 may transmit the processing result according to the control request to the second platform server 770 in operation 711.

Here, the processing result may include the second device ID indicating the second device 780 in the format of "DeviceID".

The second platform server 770 may transfer the processing result to the second adaptor 760. The second adaptor 760 may transfer the processing result to the routing server 750. Here, the second adaptor 760 may merge the second device ID included in the processing result with the ID of the second platform server 770 and may transfer the second device ID in a format of "PlatformID@DeviceID".

The routing server 750 may transfer the processing result to the first adaptor 730, the first adaptor 730 may transfer the processing result to the first platform server 720, and the first platform server 720 may transfer the processing result to the first device 710. The first device 710 may provide the processing result of the second device 780 to the user.

The description made above with reference to FIGS. 1 through 6 may be applicable to the respective operations of FIG. 7 and a further description is omitted.

FIG. 8 illustrates a process of requesting a driving of an event about a device registered to another platform server according to an example embodiment.

A process of requesting a subscription to an event occurring in a second device 880 is described with reference to FIG. 8.

A user may receive a notification about the occurrence of the event in the second device 880 through a first device 810. Here, the second device 880 may be a device included in the second device list acquired with the method of FIG. 6. For example, in response to an occurrence of an event that a washing operation is completed at a smart washing machine corresponding to the second device 880, the user may receive a notification about the occurrence of the event in the second device 880 through the first device 810.

In operation 801, the first device 810 may transmit a second device event subscription request to a first platform server 820. Here, the first device 810 may transmit, to the first platform server 820, a second device ID that is information indicating the second device 880 that is a subscription target together with the event subscription request. Here, the second device ID may include not only an ID of the second device 880 but also an ID of a second platform server 870, for example, a second device ID in a format of "PlatformID@DeviceID".

The first platform server 820 may transfer the event subscription request to a first adaptor 830.

In operation 802, the first adaptor 830 may request an authentication server 840 for a token for the event subscription request. The first adaptor 830 may transfer, to the authentication server 840, identification information of the first platform server 820 requesting the event subscription, identification information of the second platform server 870 registered at the second device 880, and a first user ID indicating a user having requested the event subscription together with the token request.

In operation 803, the authentication server 840 may create a token in response to the token request. The authentication server 840 may create the token by encoding an integrated user ID corresponding to the first user ID. Here, the integrated user ID may be determined to be different based on a time. That is, the integrated user ID may be determined to be different based on a point in time at which the token is created. Further, since the integrated user ID is determined to be different based on a time, the token created by encoding the integrated user ID may be determined to be different overtime.

In operation 804, the authentication server 840 may transmit the created token to the first adaptor 830.

In operation 805, the first adaptor 830 may transmit the event subscription request to a routing server 850 together with the token. The routing server 850 may transfer the event subscription request and the token to a second adaptor 860.

In operation 806, the second adaptor 860 may request the authentication server 840 to verify whether the received token is valid. Here, the second adaptor 860 may transmit the received token to the authentication server 840.

In operation 807, the authentication server 840 may verify whether the token received from the second adaptor 860 is valid. If the corresponding token is valid, the authentication server 840 may extract the integrated user ID from the token based on an encryption key used to create the token in operation 803.

In operation 808, the authentication server 840 may notify the second adaptor 860 about the verification result. If the corresponding token is valid, the authentication server 840 may transmit, to the second adaptor 860, a message indicating that the corresponding token is valid and a second user ID corresponding to the integrated user ID.

In operation 809, in response to receiving the message indicating that the corresponding token is valid, the second adaptor 860 may transmit the event subscription request to the second platform server 870. Here, the second adaptor 860 may also transmit the second user ID received from the authentication server 840. The second adaptor 860 may transfer, to the second platform server 870, a remaining second device ID in which an ID of the second platform server 870 is removed from the second device ID indicating the second device 880 that is a subscription target, for example, a second device ID in a format of "DeviceID".

The second platform server 870 may identify the second device 880 that is registered in association with the second user ID and corresponds to the second device ID, and may detect an event occurring in the identified second device 880.

In response to the occurrence of the event in the second device 880, the second device 880 may notify the second platform server 870 about the occurrence of the event in operation 811. Here, the event notification may include the second device ID indicating the second device 880 in the format of "DeviceID".

The second platform server 870 may notify the second adaptor 860 about the occurrence of the event. The second adaptor 860 may notify the routing server 850 about the occurrence of the event. Here, the second adaptor 860 may merge an ID of the second platform server 870 with an ID of the second device 880 included in the event notification and may transfer the ID of the second device 880 in a format of "PlatformID@DeviceID".

The routing server 850 may notify the first adaptor 830 about the occurrence of the event, the first adaptor 830 may notify the first platform server 820 about the occurrence of the event, and the first platform server 820 may notify the first device 810 about the occurrence of the event. The first device 810 may provide information about the event having occurred in the second device 880 to the user.

The description made above with reference to FIGS. 1 through 6 may be applicable to the respective operations of FIG. 8 and a further detailed description is omitted.

Figure 9:
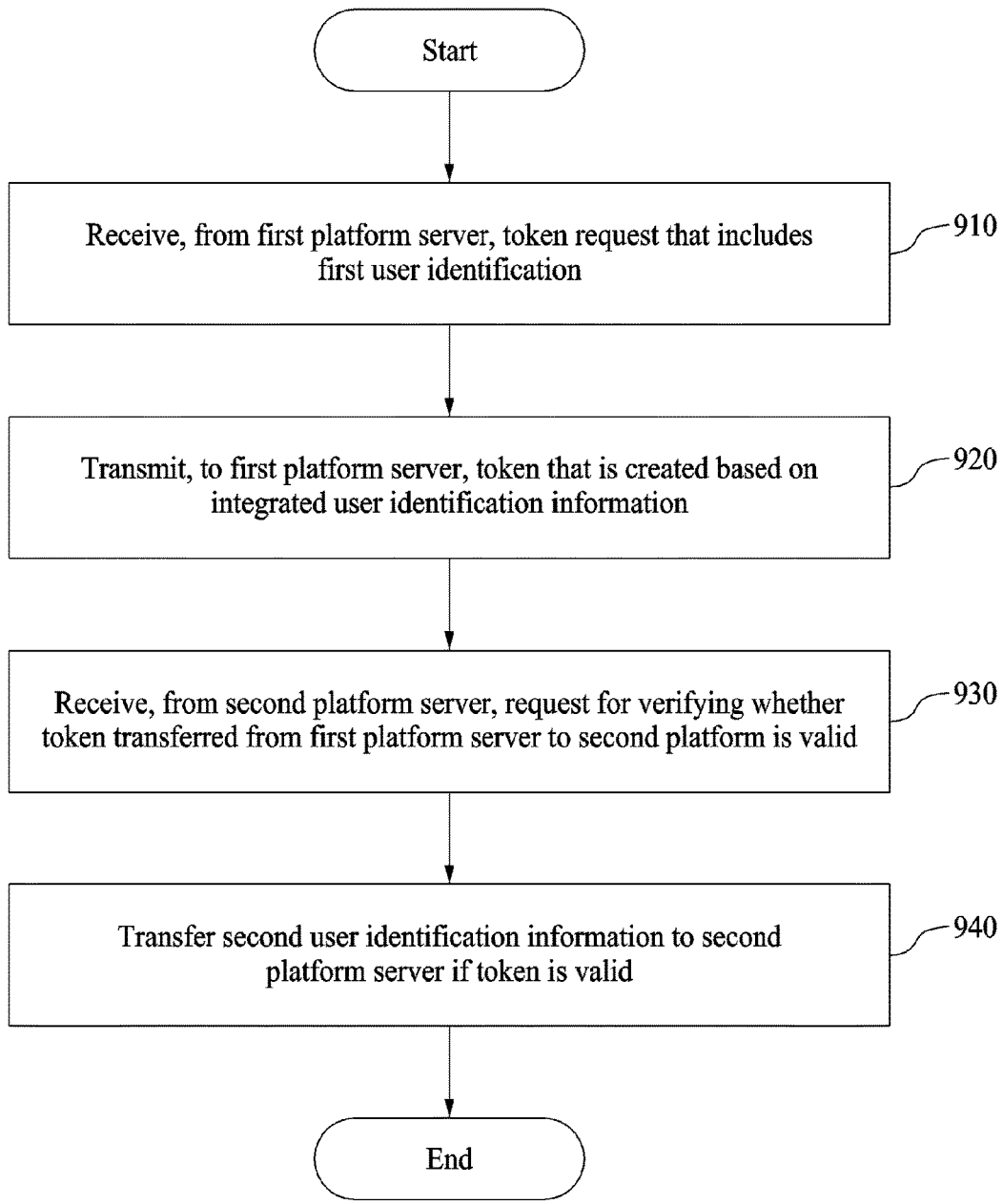
FIG. 9 is a flowchart illustrating a communication method of an interaction server according to an example embodiment.

FIG. 9 is a flowchart illustrating a communication method of an interaction server according to an example embodiment.

A communication method of an interaction server performed at a processor included in the interaction server is described with reference to FIG. 9.

In operation 910, the interaction server may receive, from a first platform server, a token request including first user identification information registered to the first platform server.

In operation 920, the interaction server may transmit, to the first platform server, a token that is created based on integrated user identification information corresponding to the first user identification information. The interaction server may create a token by encoding the integrated user identification information that varies based on a time.

In operation 930, the interaction server may receive, from a second platform server, a request for verifying whether the token transferred from the first platform server to the second platform server is valid.

If the token is valid, the interaction server may transfer, to the second platform server, second user identification information that corresponds to integrated user identification and is registered to the second platform server in operation 940.

Here, each of the first user identification information and the second user identification information may be information for identifying the same user that joins the first platform server and the second platform server. Also, the integrated user identification information may be mapped to the first user identification information and the second user identification information.

According to an example embodiment, the interaction server may perform the following operations prior to performing operation 910. The interaction server may receive, from the first platform server, an another-platform interaction request including the first user identification information. The interaction server may transmit, to the first platform server, a platform list interacting with the first platform server and transaction identification information that is created based on the integrated user identification information. In response to a successful log in the second platform server through the platform list, the interaction server may receive second user identification information and transaction identification information from the second platform server. If the transaction identification information is valid, the interaction server may map the second user identification information to the integrated user identification information and the first user identification information.

Before a valid time of the transaction identification time expires, the interaction server may receive the transaction identification information from the second platform server. If the transaction identification information is determined to be valid, the transaction server may map the second user identification information to the integrated user identification information and the first user identification information.

Also, the platform list may include a federation URL that provides an interface capable of logging in a platform interacting with the first platform server.

The description made above with reference to FIGS. 1 through 8 may be applicable to the respective operations of FIG. 9 and thus, a further detailed description is omitted here.

Figure 10:
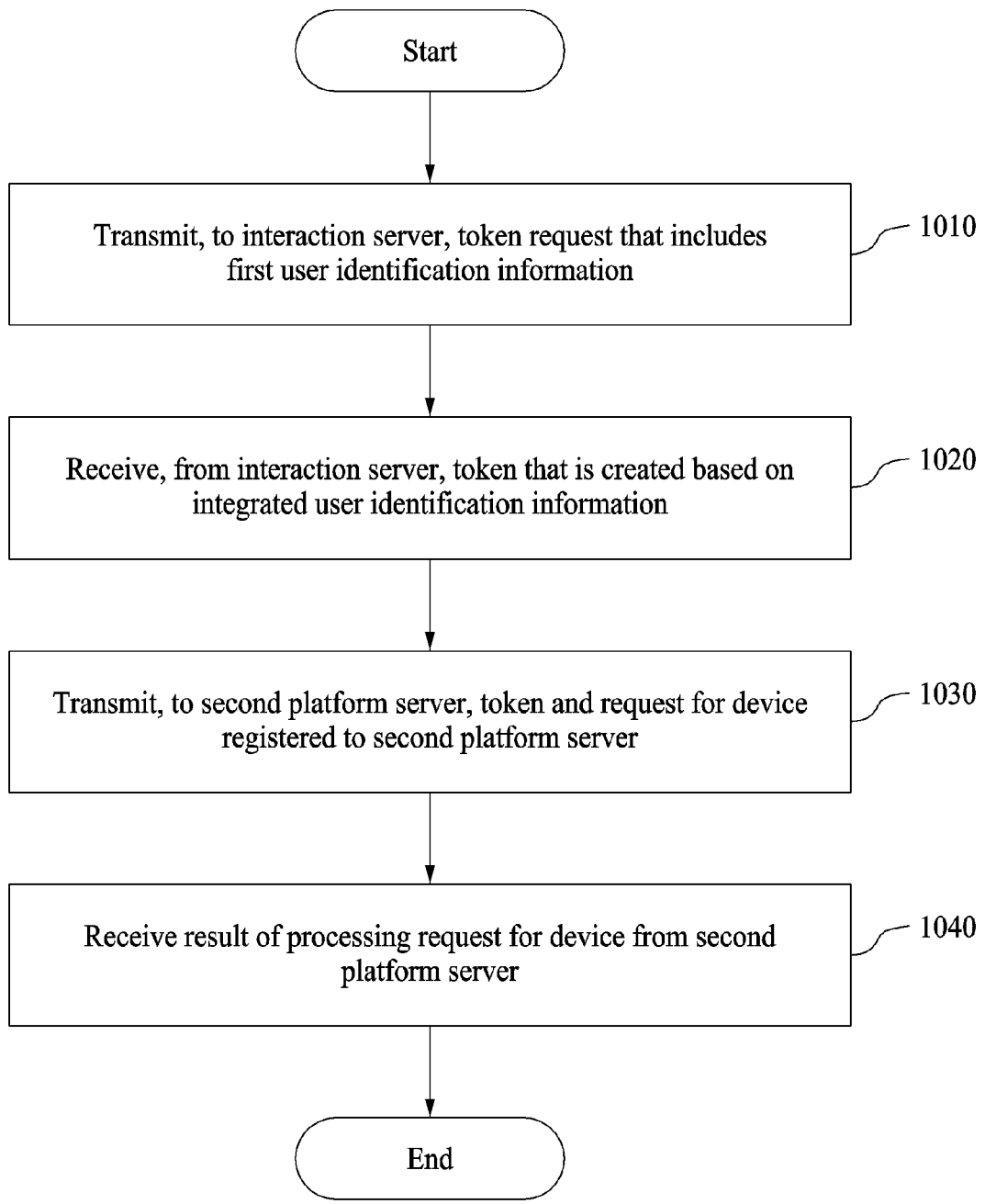
FIG. 10 is a flowchart illustrating a communication method of a first platform server according to an example embodiment.

FIG. 10 is a flowchart illustrating a communication method of a first platform server according to an example embodiment.

A communication method of a first platform server performed at a processor included in a first platform server is described with reference to FIG. 10.

In operation 1010, the first platform server may transmit, to an interaction server, a token request that includes first user identification information registered to the first platform server.

In operation 1020, the first platform server may receive, from the interaction server, a token that is created based on integrated user identification information corresponding to the first user identification information.

In operation 1030, the first platform server may transmit, to a second platform server, the token and a request for a device registered to the second platform server. Here, the request for the device may include a request for at least one of a device list of devices registered to the second platform server, a control of the device, and an event subscription of the device.

In operation 1040, the first platform server may receive a result of processing the request for the device from the second platform server.

Here, in response to receiving second user identification information that corresponds to the integrated user identification information and is registered to the second platform server, from the interaction server that determines that the token transferred from the first platform server to the second platform server is valid, the second platform server transfers the result of processing the request for the device to the first platform server.

According to an example embodiment, the first platform server may perform the following operations prior to performing operation 1010. The first platform server may transmit, to the interaction server, an another-platform interaction request that includes the first user identification information. The first platform server may receive, from the interaction server, a platform list of platforms interacting with the first platform server and transaction identification information corresponding to the first user identification information. The first platform server may transmit login information associated with the second platform server and the transaction identification information through the platform list.

Here, the second user identification information included in the login information may be transmitted from the second platform server to the interaction server in response to a successful log in the second platform server, and may be mapped to the integrated user identification information and the first user identification information.

The description made above with reference to FIGS. 1 through 8 may be applicable to the respective operations of FIG. 10 and thus, a further detailed description is omitted here.

Figure 11:
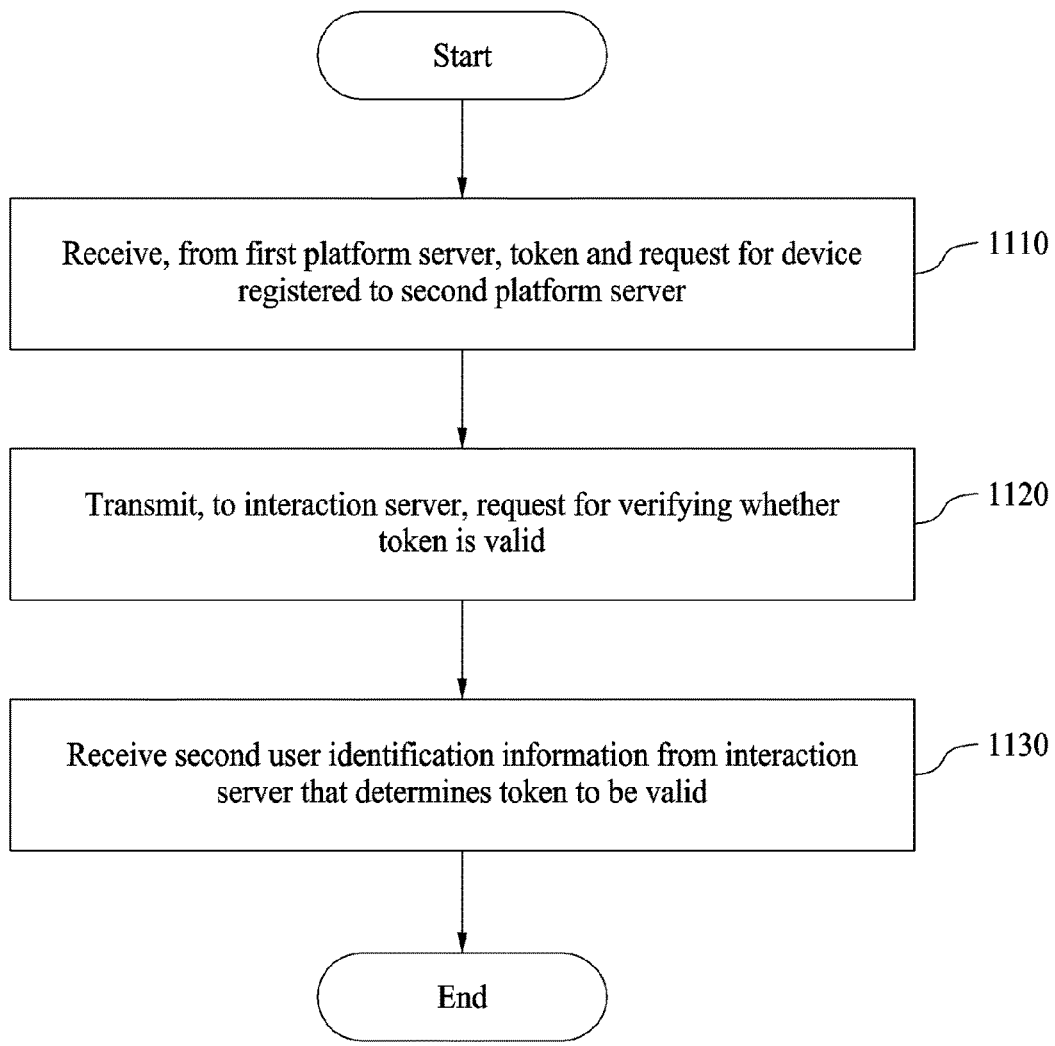
FIG. 11 is a flowchart illustrating a communication method of a second platform server according to an example embodiment.

FIG. 11 is a flowchart illustrating a communication method of a second platform server according to an example embodiment.

A communication method of a second platform server performed at a processor included in the second platform server is described with reference to FIG. 11.

In operation 1110, the second platform server may receive, from a first platform server, a token and a request for a device registered to the second platform server. Here, the token may be created based on integrated user identification information corresponding to the first user identification information registered to the first platform server in response to a request of the first platform server.

In operation 1120, the second platform server may transmit, to an interaction server, a request for verifying whether the token is valid.

In operation 1130, the second platform server may receive second user identification information that corresponds to the integrated user identification information and is registered to the second platform server, from the interaction server that determines the token to be valid.

According to an example embodiment, the second platform server may perform the following operations prior to performing operation 1110. The second platform server may receive, from the first platform server that requests an interaction with another platform, login information associated with the second platform server and transaction identification information corresponding to the integrated user identification information. In response to a successful log in the second platform server based on the login information, the second platform server may transmit the transaction identification information and the second user identification information to the interaction server.

Here, the second user identification information may be mapped to the integrated user identification and the first user identification information through the interaction server that determines the transaction identification information received from the second platform server to be valid.

The description made above with reference to FIGS. 1 through 8 may be applicable to the respective operations of FIG. 11 and thus, a further detailed description is omitted here.

Figure 12:
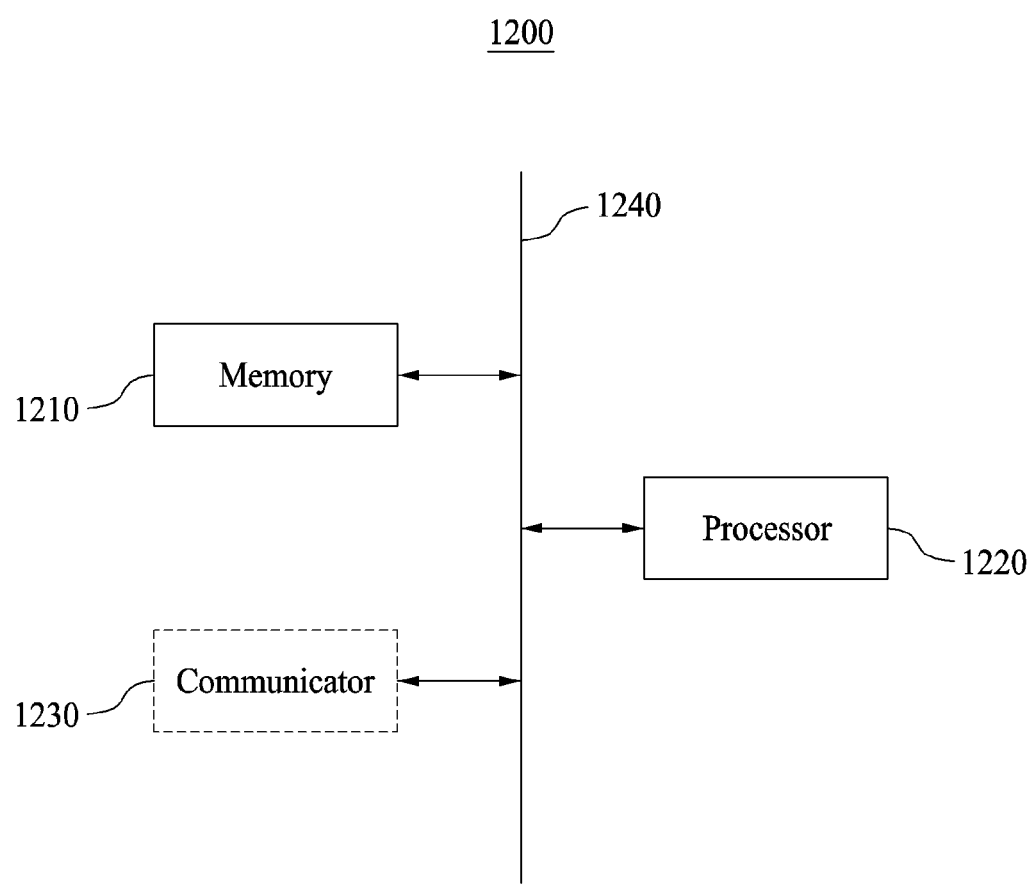
FIG. 12 is a diagram illustrating an interaction server according to an example embodiment.

FIG. 12 is a diagram illustrating an interaction server according to an example embodiment.

Referring to FIG. 12, an interaction server 1200 may include a memory 1210 and a processor 1220. The interaction server 1200 may further include a communicator 1230 configured to communicate with another apparatus included in a home network system.

The memory 1210 may store a communication method performed at the processor 1220.

The processor 1220 may receive, from a first platform server, a token request that includes first user identification information registered to the first platform server. The processor 1220 may transmit, to the first platform server, a token that is created based on integrated user identification information corresponding to the first user identification information. The processor 1220 may receive, from a second platform server, a request for verifying whether the token transferred from the first platform server to the second platform server is valid. If the token is valid, the processor 1220 may transfer, to the second platform server, second user identification information that corresponds to the integrated user identification information and is registered to the second platform server.

The description made above with reference to FIGS. 1 through 9 may be applicable to the respective constituent elements of FIG. 12 and thus, a further detailed description is omitted here.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of an interaction server that enables an interaction between a first platform server and a second platform server providing different platforms, the communication method being performed by the interaction server and comprising:
   receiving, from the first platform server, a token request and first user identification information, the first user identification information being registered with the first platform server;
   transmitting, to the first platform server, a token that is created based on integrated user identification information corresponding to the first user identification information, wherein the integrated user identification information is created by the interaction server and refers to user identification for the interaction between the first and second platform servers;
   after the token is transferred from the first platform server to the second platform server, receiving, from the second platform server, a request for verifying validity of the token; and
   when the token is determined as valid by the interaction server, transferring, to the second platform server, second user identification information that corresponds to the integrated user identification information and is registered with the second platform server, to thereby allow a device registered with one of the first and second platform servers to control a device registered with another of the first and second platform servers,
   wherein the token is created by encoding the integrated user identification information, and
   wherein the integrated user identification information is changed at predetermined intervals.

2. The communication method of claim 1, wherein:
   the first user identification information and the second user identification information are information for identifying the same user that joins the first platform server and the second platform server, and
   the integrated user identification information is mapped to both the first user identification information and the second user identification information.

3. The communication method of claim 1, further comprising:
   receiving, from the first platform server, an another-platform interaction request and the first user identification information;
   transmitting, to the first platform server, a platform list of platforms interacting with the first platform server and transaction identification information that is created based on the integrated user identification information;
   receiving the second user identification information and the transaction identification information from the second platform server, in response to a successful login into the second platform server through the platform list; and
   when the transaction identification information is determined as valid by the interaction server, mapping the second user identification information to the integrated user identification information and the first user identification information.

4. The communication method of claim 3, wherein the mapping comprises:
   receiving the transaction identification information from the second platform server before a valid time of the transaction identification information expires, and
   when the transaction identification information is determined as valid by the interaction server, mapping the second user identification information to the integrated user identification and the first user identification information.

5. The communication method of claim 3, wherein the platform list includes a federation uniform resource locator (URL) that provides an interface for logging in a platform interacting with the first platform server.

6. A communication method of a first platform server that interacts with a second platform server providing a different platform through an interaction server, the communication method being performed by the first platform server and comprising:

transmitting, to the interaction server, a token request and first user identification information, the first user identification information being registered with the first platform server;

receiving, from the interaction server, a token that is created based on integrated user identification information corresponding to the first user identification information, wherein the integrated user identification information is created by the interaction server and refers to user identification for the interaction between the first and second platform servers;

transmitting, to the second platform server, the token and a request for a device registered with the second platform server; and receiving a processing result of the request for the device from the second platform server, wherein the second platform server is configured to transmit the processing result of the request for the device to the first platform server, when the second platform server receives second user identification information, which corresponds to the integrated user identification information and is registered with the second platform server, from the interaction server which determines that the token transferred from the first platform server to the second platform server is valid, to thereby allow a device registered with the first platform server to control the device registered with the second platform server, wherein the token is created by encoding the integrated user identification information, and wherein the integrated user identification information is changed at predetermined intervals.

7. The communication method of claim 6, wherein the request for the device includes a request for at least one of a device list registered with the second platform server, a control of the device, and an event subscription of the device.

8. The communication method of claim 6, further comprising:

transmitting, to the interaction server, an another-platform interaction request and the first user identification information;

receiving, from the interaction server, a platform list of platforms interacting with the first platform server and transaction identification information that is created based on the integrated user identification information; and transmitting login information associated with the second platform server and the transaction identification information through the platform list, wherein in response to a successful login into the second platform server, the second user identification included in the login information is transmitted from the second platform server to the interaction server and is mapped to the integrated user identification information and the first user identification information.

9. The communication method of claim 6, wherein:

the first user identification information and the second user identification information are information for identifying the same user that joins the first platform server and the second platform server, and the integrated user identification information is mapped to both the first user identification information and the second user identification information.

10. A communication method of a second platform server that interacts with a first platform server providing a different platform through an interaction server, the communication method being performed by the second platform server and comprising:

receiving, from the first platform server, a token and a request for a device registered with the second platform server, wherein the token is created based on integrated identification information corresponding to first user identification information registered with the first platform server in response to a token request from the first platform server, and wherein the integrated user identification information is created by the interaction server and refers to user identification for the interaction between the first and second platform servers;

after the token is transferred from the first platform server to the second platform server, transmitting, to the interaction server, a request for verifying validity of the token; and receiving second user identification information, which corresponds to the integrated user identification information and is registered with the second platform server, from the interaction server which determines that the token is valid, to thereby allow a device registered with one of the first and second platform servers to control a device registered with another of the first and second platform servers, wherein the token is created by encoding the integrated user identification information, and wherein the integrated user identification information is changed at predetermined intervals.

11. The communication method of claim 10, wherein the request for the device includes a request for at least one of a device list registered with the second platform server, a control of the device, and an event subscription of the device.

12. The communication method of claim 10, further comprising:

transmitting a processing result of the request for the device to the first platform server together with identification information of the device and identification information of the second platform server.

13. The communication method of claim 10, further comprising:

receiving, from the first platform server that requests an interaction with another platform, login information associated with the second platform server and transaction identification information corresponding to the integrated user identification information; and transmitting the transaction identification information and the second user identification information to the interaction server in response to a successful login into the second platform server based on the login information, wherein the second user identification information is mapped to the integrated user identification information and the first user identification information through the interaction server that determines the transaction identification information received from the second platform server to be valid.

14. The communication method of claim 10, wherein:

the first user identification information and the second user identification information are information for identifying the same user that joins the first platform server and the second platform server, and the integrated user identification information is mapped to both the first user identification information and the second user identification information.

* * * * *